E. C. OLIVER.
PHONOGRAPH.
APPLICATION FILED MAY 12, 1919.
1,409,759.
Patented Mar. 14, 1922.
2 SHEETS—SHEET 1.
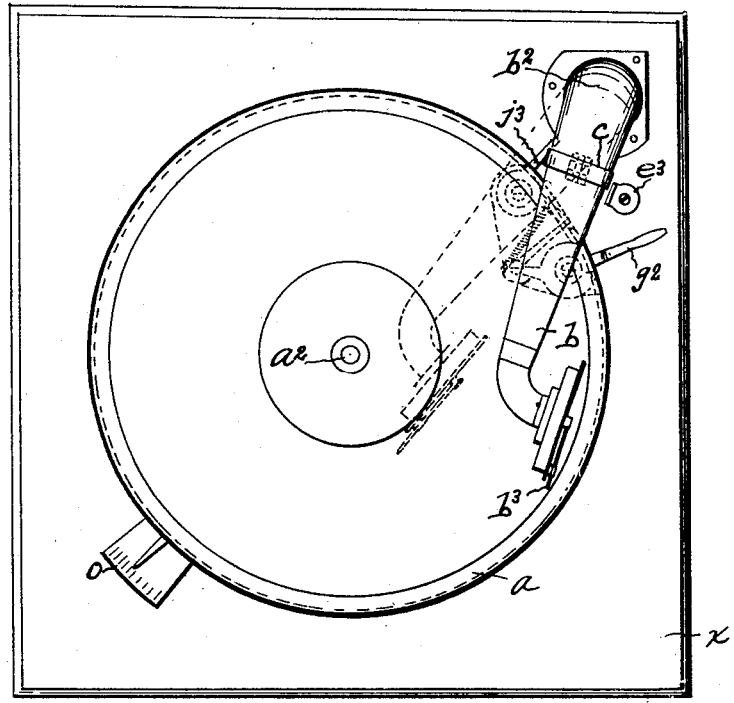
Fig. 1.
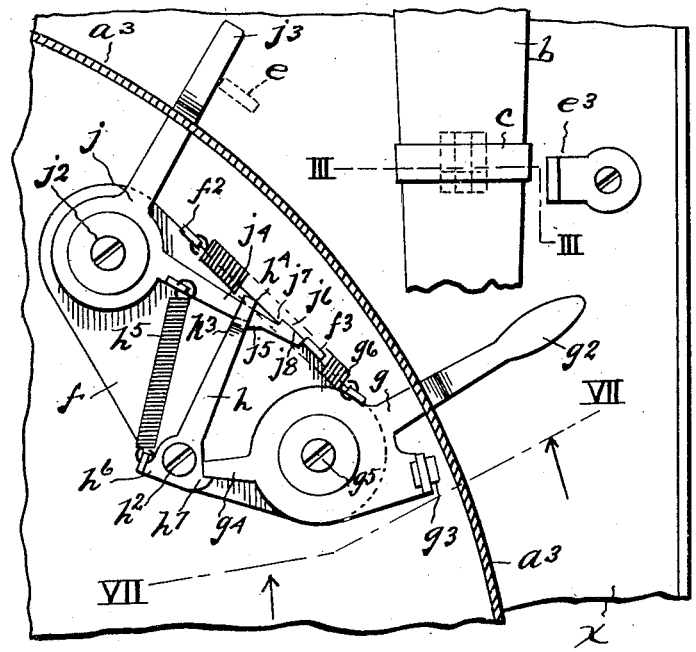
Fig. 2.
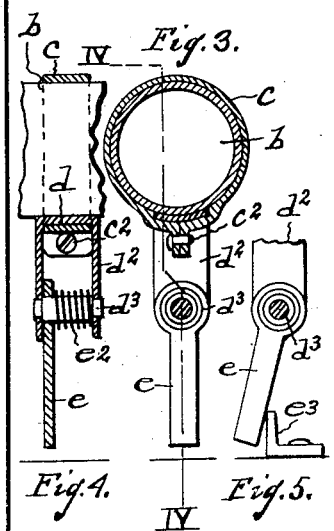
Fig. 3.
Fig. 4.
Fig. 5.
INVENTOR
Edd C. Oliver,
BY Rolzemond A. Parker
HIS ATTORNEY.

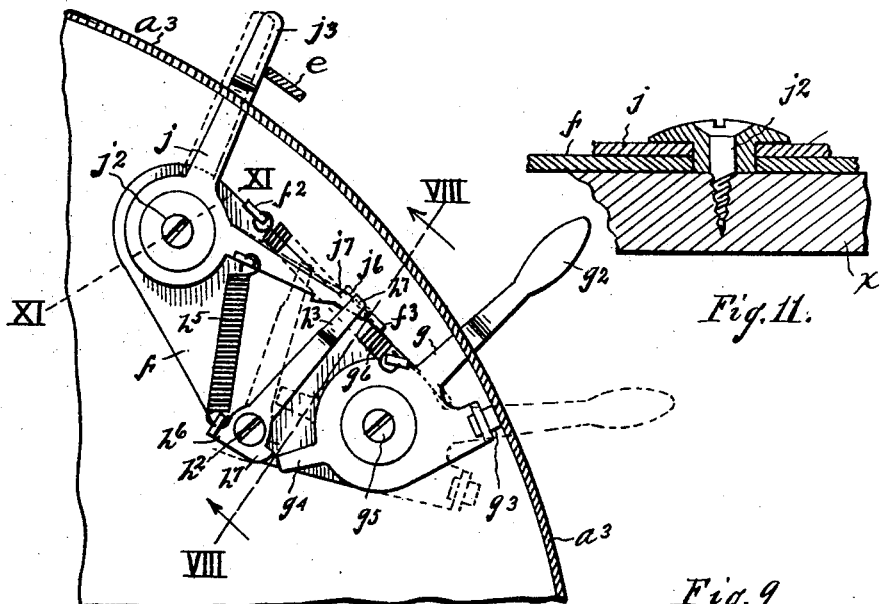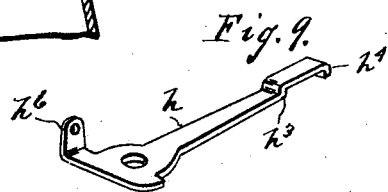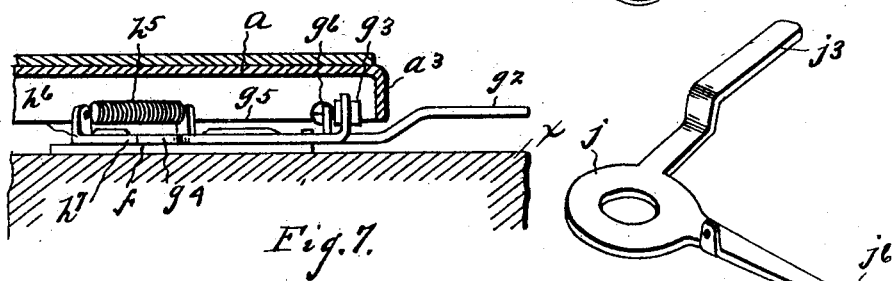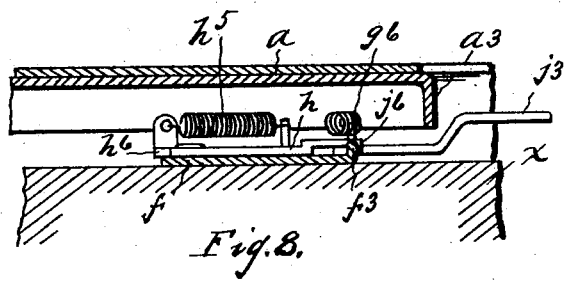

UNITED STATES PATENT OFFICE.

EDD C. OLIVER, OF ADRIAN, MICHIGAN.

PHONOGRAPH.

1,409,759.

Specification of Letters Patent. Patented Mar. 14, 1922.

Application filed May 12, 1919. Serial No. 296,319.

*To all whom it may concern:*

Be it known that I, EDD C. OLIVER, a citizen of the United States, residing at Adrian, county of Lenawee, State of Michigan, have invented a certain new and useful Improvement in Phonographs, and declare the following to be a full, clear, and exact description of the same, such as will enable others skilled in the art to which it pertains to make and use the same, reference being had to the accompanying drawings, which form a part of this specification.

My invention relates to phonographs and an object of my improvements is to provide an improved starting and stopping mechanism for the disk and to assure that the record shall be completely traversed by the needle and at a uniform rate.

I secure this object in the device illustrated in the accompanying drawings in which;

Figure 1 is a plan view of a phonograph with an apparatus embodying my invention attached thereto.

Figure 2 is a detail plan view of such mechanism, the disk-carrying table being cut away except as to the down-turned flange at its peripheral edge, which is shown in section.

Figure 3 is a detail sectional view on the line III—III Fig. 2.

Figure 4 is a detail section on the line IV—IV Fig. 3.

Figure 5 is a view of the lower portion of Figure 3 showing the actuating finger in a different position from that of Figure 4.

Figure 6 is a view similar to Fig. 2, the parts being shown adjusted to a different position.

Figure 7 is a detail sectional view on the line VII—VII Fig. 2.

Figure 8 is a detail sectional view on the line VIII—VIII Fig. 6.

Figure 9 is a perspective view of the tripping pawl.

Figure 10 is a perspective view of the bell-crank disengaging lever.

Figure 11 is a detail section on the line XI—XI Fig. 6.

$x$ is the table and $a$ is the record-carrying disk carried by the table $x$ and adapted to rotate about an axis $a^2$ thereon. $a^3$ is a peripheral flange extending downward around the edge of the disk $a$.

$b$ is the tone-arm carrying the needle $b^3$ at its free end adapted to turn about an axis $b^2$ to carry the needle $b^3$ over the record upon the disk $a$. $c$ is a flexible metal band passing around the arm $b$ located thereon between the disk $a$ and the pivot of said arm, and adapted to be clamped in position by a screw and lugs $c^2$ (Fig. 4) in a usual way. $d$ is a U-shaped strip of metal having its cross piece secured to the arm $b$ by the band $c$ passing over said cross piece. $d^2$ $d^2$ are parallel downwardly-extending branches of the U-piece, or strip, $d$. $d^3$ is a cylindrical rod, or pin, having its end secured in the branches $d^2$ $d^2$ and extending between said branches. $e$ is a flat arm pivoted upon the pin $d^3$ and having its side resting against the inner surface of one of the arms $d^2$. $e^2$ is a compression spring threaded over the pin $d^3$ and acting to force the arm $e$ against its adjacent branch $d^2$ of the U-piece $d$. By this construction the arm $e$ may be turned about the pivot $d^3$ by using some little force, but it is held in any position to which it is adjusted by the friction due to the pressure of the spring $e^2$ unless a sufficient force is brought upon it to overcome said friction. The lower end of the arm $e$ extends in the neighborhood of the surface of the table $x$.

$f$ is a metal plate adapted to be secured to the surface of the table $x$ within the downwardly extending flange $a^3$ of the record-carrying table $a$.

$g$ is a lever arm pivoted to the plate $f$ and having a handle $g^2$ extending outside of the flange $a^3$ in position to be manipulated by the operator. $g^3$ is a contact pad, or brake, located upon an offset from the lever $g$. $g^6$ is a tension spring secured at one end to a lug $f^2$ rising from the plate $f$ and at the other end to an eccentric lug on the lever arm $g$ so that said spring will normally turn the lever $g$ about its pivot $g^5$ and bring the pad $g^3$ into contact with the inner surface of the flange $a^3$ so as to hold the disk $a$ from rotation. $g^4$ is a lug extending from the lever arm $g$.

$h$ is a lever arm pivoted at $h^2$ to the disk $f$ and provided with a tooth $h^7$ adapted to engage the lug $g^4$ to form a catch for holding the lever $g$ in the position shown in Fig. 2 with the pad $g^3$ out of contact with the flange $a^3$.

$j$ is a bell-crank lever pivoted at $j^2$ to the plate $f$ and having an arm or handle $j^3$ extending to a point outside of the flange $a^3$ of the disk $a$ and having a second arm $j^4$ extending into position to engage the arm $h$. $h^5$ is a spring secured at one end to an eccentric lug on the lever arm $h$ and at the other end to a lug upon the arm $j^4$ of the bell-crank lever $j$. The arm $j^4$ is provided with a tooth $j^5$ adapted to engage a shoulder $h^3$ on the arm $h$ to hold said arm in the position shown in Fig. 2 at which time the lug $g^4$ of the lever $g$ is engaged by the tooth $h^7$ on said arm $h$ so as to hold the pad $g^3$ out of engagement with the flange $a^3$. The spring $h^5$ holds the arm $j^4$ in engagement with the arm $h$. $j^6$ is a surface somewhat elevated from the average surface of the outer edge of the arm $j^4$ and located toward the end of said arm. The lever arm $h$ is bent over at its outer end at $h^4$ so as to limit the outward motion of the arm $j^4$. $j^7$ is a shoulder on the outer edge of the lever arm $j^4$ at the commencement of the elevated portion.

The shoulder $h^3$ extends into the line of travel of the arm $j^4$ so as to limit the inward motion of said arm by contacting the inner edge of the same.

The arm $j^3$ where it extends outside of the flange $a^3$ is located in the path of travel of the arm $e$ when the latter is carried by the tone-arm $b$ to the inward limit of its travel.

$e^3$ is a lug secured upon the table $x$ at a position outside of the operative travel of the tone-arm $b$ but in position to engage the arm $e$ when the tone-arm $b$ is turned outward beyond its working position so as to turn the arm $e$ inward as shown in Fig. 5 at which position said arm is held by its friction against the U-piece $d$.

The operation of the above described device is as follows:

In the inoperative condition of the phonograph the arm $j^4$ has been disengaged from the arm $h$ and the latter has been drawn to the position in which the tooth $h^7$ is outside of the line of travel of the lug $g^4$ of the lever $g$. In this position of the parts the spring $g^6$ has rotated the lever $g$ about its pivot $g^5$ bringing the pad $g^3$ forcibly against the flange $a^3$ and preventing the motion of the record-carrying disk $a$.

The position of the parts are then as shown in Fig. 6 in full lines. The arm $h$ engaging the elevated surface $j^6$ and holding the arm $j^3$ in the position indicated by full lines in said figure.

When it is desired to have a record played the operator manipulates the handle $g^2$ to turn the lever $g$ about its pivot $g^5$ as indicated by dotted lines in Fig. 6. This actuates the arm $h$, because of the contact of the end of the lug $g^4$ therewith, to press said arm to a position in which the shoulder $h^3$ thereon, will be engaged by the tooth $j^5$ on the arm $j^4$ and held in such a position that the tooth $h^7$ is interposed in the line of travel of the lug $g^4$ which will therefore engage said lug and hold the lever $g$ in the position shown in Fig. 2, with the pad $g^3$ out of engagement with the flange $a^3$.

The spring $h^5$ acts to hold the tooth $j^5$ in engagement with the shoulder $h^3$ on the arm $h$. When in this position the shoulder $h^3$ engages the lower edge of the arm $j^4$ and holds the bell-crank lever in a position indicated by dotted lines in Fig. 6, a little further along in the line of travel of the arm $e$ than it is in the engaged position shown in full lines in Fig. 6.

Before the brake $g$ is released and set at its disengaged position and while the parts are in the position shown in full lines in Fig. 6 the tone-arm $b$ is thrown outward until the arm $e$ strikes against the lug $e^3$ turning it, say, to the position shown in Fig. 5. The tone-arm is then moved to its inner position where the needle $b^3$ is in the last groove of the record. This brings the arm $e$ in contact with the arm $j^3$ turning the arm $e$ against its pivotal friction to a definite angle. The arm $j^3$ is held against the action of the arm $e$ by the inturned portion $h^4$ of the arm $h$ engaging the surface $j^6$ on the arm $j^4$.

The tone-arm $b$ is then turned until the needle $b^3$ engages in the outer groove of the record and the brake $g$ is released and set as shown in Figure 2 so that the apparatus is set in motion.

In playing the record the tone-arm $b$ gradually moves inward along the rotating record and over the record-carrying table $a$.

When the tone-arm is approaching the end of the record the arm $e$ will not be quite in contact with the arm $j^3$, because the latter has moved backward from its previous position to the position indicated in dotted lines in Fig. 6 consequently the record will be completely played to the end and the needle $b^3$ will be completely clear of the record grooves when the arm $e$ strikes the arm $j^3$ thus turning the arm $j$ about its pivot $j^2$ raising the tooth $j^5$ out of engagement with the shoulder $h^3$ permitting the arm $h$ to turn about its pivot $h^2$ under the influence of the tension of the spring $h^5$ until the outer end of the arm $h$ strikes against the shoulder $j^7$ rising from the outer edge of the arm $j^4$ at the commencement of the engaging surface $j^6$. In this position the lug $h^7$ has been withdrawn from the line of travel of the lug $g^4$ and the lever $g$ is turned about its pivot $g^5$ by the spring $g^6$ thus engaging the pad $g^3$ with the flange $a^3$ and stopping and holding from rotation the record-carrying disk $a$. When the arm $e$ is withdrawn from contact with the arm $j^3$ the arm $j^4$ turns under the influence of the spring $h^5$ and the arm $h$ is turned into contact with the lug $j^3$ with its inturned portion $h^4$ engaging the surface $j^6$ with the parts in the position shown in full lines in Figure 6. There is necessarily some lost motion in the joints and points of contact in an apparatus of this kind, and when the arm $e$ is set to its operative position by contact with the arm $j^3$ the point of tripping would be somewhat advanced from such set position due to the lost motion and resilience of the parts, therefore I have provided for advancing the position of the arm $j^3$ and amount sufficient to compensate for such effect.

The engaging lug $h^7$ is much closer to the pivot $h^2$ of the arm or catch $h$ than is the point of engagement to hold said arm in its engaged position, therefore the forces in the latter position are much less and a more delicate construction may be used and when this latter engagement is released the spring carries the arm $h$ quickly to a position to loosen the stronger engagement between the arm $h$ and the arm $g$.

What I claim is:

1. In a phonograph having a record-carrying part, and a tone-arm, an adjustable actuating arm carried by said tone-arm, said actuating arm being adapted to be moved to different positions and to retain sufficient resistance to turn when it is moved for the purpose described, a device adapted to engage the record-carrying part to hold the same from movement, a catch device having an interposed part adapted to hold said engaging part in its disengaged position or to release the same to permit it to engage the record-carrying part, said catch device having a part interposed in the line of travel of said actuating arm so that said interposed part shall be slightly nearer the tone-arm in the disengaged position of said catch device than in the engaged position of the same, said actuating arm being adapted to strike against said interposed part to release said catch device and to be set to a proper actuating position by said interposed part in the disengaged position of the catch device.

2. The combination of a phonograph having a record-carrying part and a tone-arm, an engaging part adapted to hold said record-carrying part from movement or release the same, a pivoted catch having a tooth adapted to hold said engaging part in its disengaged position, and engaging and disengaging means acting upon said catch at a greater distance from its pivot than said tooth for holding said catch in position to retain said engaging part in its disengaged position, and means carried by said tone-arm for disengaging the holding means of said catch.

3. In a phonograph having a record-carrying part, and a tone-arm, an adjustable actuating arm carried by said tone-arm, said actuating arm being adapted to be moved to different positions and to retain sufficient resistance to turn when it is moved for the purpose described, a device adapted to engage the record-carrying part to hold the same from movement, a catch device having an interposed part adapted to hold said engaging part in its disengaged position or to release the same to permit it to engage the record-carrying part, said catch device having a part interposed in the line of travel of said actuating arm so that said interposed part shall be slightly nearer the tone-arm in the disengaged position of said catch device than in the engaged position of the same, said actuating arm being adapted to strike against said interposed part to release said catch device and to be set to a proper actuating position by said interposed part in the disengaged position of the catch device, and a lug adapted to engage said actuating arm toward the outer travel of the tone-arm, to adjust said actuating arm to a position to be set by contact with said interposed part.

4. The combination of a phonograph having a record-carrying part and a tone-arm, an engaging part adapted to hold said record-carrying part from movement or release the same, a pivoted catch having a tooth adapted to hold said engaging part in its disengaged position, means for engaging and disengaging said catch and means carried by said tone-arm for disengaging the engaging means of said catch.

5. In a phonograph having a record-carrying part, and a tone-arm, an adjustable actuating arm carried by said tone-arm, said actuating arm being adapted to be moved to different positions and to retain sufficient resistance to turn when it is moved for the purpose described, a device adapted to engage the record-carrying part to hold the same from movement, a catch device having an interposed part adapted to hold said engaging part in its disengaged position or to release the same to permit it to engage the record-carrying part, said catch device having a part interposed in the line of travel of said actuating arm so that said interposed part shall be slightly nearer the tone-arm in the disengaged position of said catch device than in the engaged position of the same, said actuating arm being adapted to strike against said interposed part to release said catch device and to be set to a proper actuating position by said interposed part in the disengaged position of the catch device, and an automatic retaining device for holding said catch device in one position and in the other.

6. In combination with a phonograph having a record-carrying part, a spring actuated brake for said carrying-part, a lever arm having a catch thereon for retaining said brake device in its disengaged position, a second lever arm having a catch for retaining the first named lever arm in its engaging position, said second arm having a part interposed in the line of travel of an extension from the tone-arm, the first named arm being adapted to engage said second arm to prevent its movement under the actuation of the extension from the tone-arm at a position in advance of the tripping position.

7. In an apparatus of the kind described, in combination with a record-carrying part, a brake $g$, a lever arm $h$ adapted to catch and retain said brake in its disengaged position, a bell-crank lever $j$ having an arm $j^4$ engaged by the arm $h$, and a second arm extending into position to be actuated by a part attached to the tone-arm, the part $j$ being provided with an engaging arm $j^4$ having a catch $j^5$ and a shoulder $j^7$ and an elevated surface $j^6$, the arm $h$ being adapted to engage the arm $j^4$ for the purpose described.

In testimony whereof, I sign this specification.

EDD C. OLIVER.